United States Patent
Ma et al.

(10) Patent No.: US 8,072,664 B1
(45) Date of Patent: Dec. 6, 2011

(54) BIAXIAL SCANNING MIRROR HAVING RESONANT FREQUENCY ADJUSTMENT

(75) Inventors: Wei Ma, Hong Kong (HK); Francis Chee-Shuen Lee, Hong Kong (HK); Ho Yin Chan, Hong Kong (HK)

(73) Assignee: Hong Kong Applied Science & Technology Research Institute, Ltd., Hong Kong (HK)

( * ) Notice: Subject to any disclaimer, the term of this patent is extended or adjusted under 35 U.S.C. 154(b) by 66 days.

(21) Appl. No.: 12/788,065

(22) Filed: May 26, 2010

(51) Int. Cl.
*G02B 26/08* (2006.01)

(52) U.S. Cl. ................................... 359/199.4

(58) Field of Classification Search .............. 359/199.1, 359/199.4, 212.1, 212.2, 213.1, 214.1, 223.1–226.1
See application file for complete search history.

(56) References Cited

U.S. PATENT DOCUMENTS

| | | | | |
|---|---|---|---|---|
| 6,512,622 B2 | 1/2003 | Wine | | 359/199 |
| 6,525,310 B2 | 2/2003 | Dunfield | | 250/235 |
| 6,538,799 B2 | 3/2003 | McClelland | | 359/291 |
| 6,707,351 B2 | 3/2004 | Gorrell | | 333/186 |
| 6,753,639 B2 | 6/2004 | Ma | | 310/309 |
| 7,034,370 B2 | 4/2006 | Kuo | | 257/414 |
| 7,187,488 B2 | 3/2007 | Fu | | 359/849 |
| 7,255,768 B2 | 8/2007 | Ko | | 156/272.2 |
| 7,482,730 B2 | 1/2009 | Davis | | 310/311 |
| 7,591,201 B1 | 9/2009 | Bernstein | | 74/3.2 |
| 2004/0085617 A1* | 5/2004 | Helsel et al. | | 359/292 |
| 2010/0002284 A1 | 1/2010 | Huang | | 359/290 |

* cited by examiner

*Primary Examiner* — Euncha Cherry
(74) *Attorney, Agent, or Firm* — Ella Cheong Hong Kong Ltd.; Margaret Burke; Sam Yip

(57) ABSTRACT

A biaxial micro-electromechanical (MEMS) device is disclosed. The device includes a gimbal rotatable about a gimbal axis of rotation. A pair of gimbal torsion bars connects the gimbal to a support along the gimbal rotation axis. A mirror plate is rotatable about a mirror axis of rotation, the mirror plate rotation axis being substantially perpendicular to the gimbal rotation axis. A pair of mirror plate torsion bars connects the mirror plate to the gimbal along the mirror plate axis of rotation. One or more gimbal moment-of-inertia-altering blocks are positioned on a surface of the mirror plate away from the gimbal axis of rotation. Additionally, one or more mirror plate moment-of-inertia-altering blocks are positioned on a surface of the mirror plate away from the mirror plate rotation axis such that the distance from the mirror plate axis determines a resonant frequency of the biaxial MEMS device.

20 Claims, 18 Drawing Sheets

US 8,072,664 B1

BIAXIAL SCANNING MIRROR HAVING RESONANT FREQUENCY ADJUSTMENT

FIELD OF THE INVENTION

The invention relates to micro-electromechanical systems (MEMS) in general, and, more particularly, to adjustment of the resonant frequency of MEMS systems.

BACKGROUND OF THE INVENTION

MEMS scanning devices find application in a wide variety of electrical, mechanical, and optical systems. A non-exhaustive list of applications includes scanners, displays, projectors, switches, printers, barcode readers, retinal displays, resonators, and sensors. MEMS scanning devices may be driven by, for example, electrostatic actuation, electromagnetic actuation, a combination of electrostatic and electromagnetic actuation, and piezoelectric actuation.

In scanning applications, MEMS devices are typically driven at their resonant frequencies to produce the desired scanning angle and scanning speed. When using a MEMS device as a mirror in a scanning device, the mirror size affects the resulting resonant frequency. If a large mirror size is used, it is difficult to obtain a high resonant frequency. If the mirror size or mass is decreased, the resonant frequency increases.

Various approaches have been used to alter the resonant frequency of MEMS devices. U.S. Pat. No. 6,256,131 describes a MEMS mirror including selectively removable tabs. The resonant frequency is measured and tabs are removed via laser trimming to reduce the mass of the mirror body to increase the resonant frequency to a desired frequency.

U.S. Pat. No. 7,034,370 uses a voltage differential between electrodes to tune the natural frequency of a MEMS structure and thereby increase the manufacturing yield.

U.S. Pat. No. 6,753,639 discloses a MEMS microbeam oscillator which has material added to or decreased from its surface to tune the oscillator. The material is ablated via a laser following measurement of the resonant frequency of the oscillator. Similarly, material may be deposited onto the upper surface of the microbeam oscillator to tune the device.

U.S. Pat. No. 7,187,488 uses laser or ion beam trimming of a MEMS mirror in a sacrificial portion to fine tune the natural frequency of the device. U.S. Patent Application Publication 2010/0002284 describes a method of modulating the resonant frequency of a torsional MEMS device. The resonant frequency of a MEMS device is measured and if it is greater than a standard resonant frequency, a mass increaser is bonded to the back surface of the MEMS device. As shown in the figures, these mass increasers are positioned along the single torsional axis of the MEMS device.

There remains a need in the art for improved techniques for altering the resonant frequency of MEMS devices, particularly for reducing the resonant frequency of MEMS devices.

SUMMARY OF THE INVENTION

The present invention relates to biaxial MEMS devices in which the resonant frequency may be altered through the addition of moment-of-inertia-altering blocks to the device.

As discussed above, a MEMS biaxial scanning mirror is typically driven at its resonant frequency to achieve a large scanning angle. However, there are many applications for MEMS scanning mirrors which require different resonant frequencies. Therefore, it is a desirable feature to have a flexible design for the MEMS scanning mirror to create devices with different resonant frequencies. For example, a scanning mirror for a touch panel application requires a low resonant frequency. Low resonant frequencies can be realized by large moments of inertia, typically via a large-area mirror plate. However, it is not easy to achieve a large amplitude/scanning angle for a large-area mirror plate MEMS device since the mirror plate suffers greater damping force during rotation. Further, large-area mirror plates increase the cost of MEMS devices.

In a biaxial scanning mirror design, the mechanical properties of the mirror plate are usually coupled to those of the gimbal structure. Any adjustment to the resonant frequency of mirror plate typically causes a corresponding change for to the gimbal resonant frequency. Therefore, techniques are needed to reduce the unwanted resonant frequency change or to adjust one component to a desired resonant frequency value while adjusting the resonant frequency of another component.

The present embodiments describe a biaxial MEMS device that includes a gimbal rotatable about a gimbal axis of rotation. A pair of gimbal torsion bars connects the gimbal to a support along the gimbal rotation axis. A mirror plate is rotatable about a mirror axis of rotation, the mirror plate rotation axis being substantially perpendicular to the gimbal rotation axis. A pair of mirror plate torsion bars connects the mirror plate to the gimbal along the mirror plate axis of rotation. One or more gimbal moment-of-inertia-altering blocks are positioned on a rear surface of the mirror plate away from the gimbal axis of rotation. Additionally, one or more mirror plate moment-of-inertia-altering blocks are positioned on a rear surface of the mirror plate away from the mirror plate rotation axis such that the distance from the mirror plate axis determines a resonant frequency of the biaxial MEMS device.

BRIEF DESCRIPTION OF THE DRAWINGS

FIG. 1 shows simplified perspective views of a biaxial MEMS structure.

DETAILED DESCRIPTION

Figure 1A:
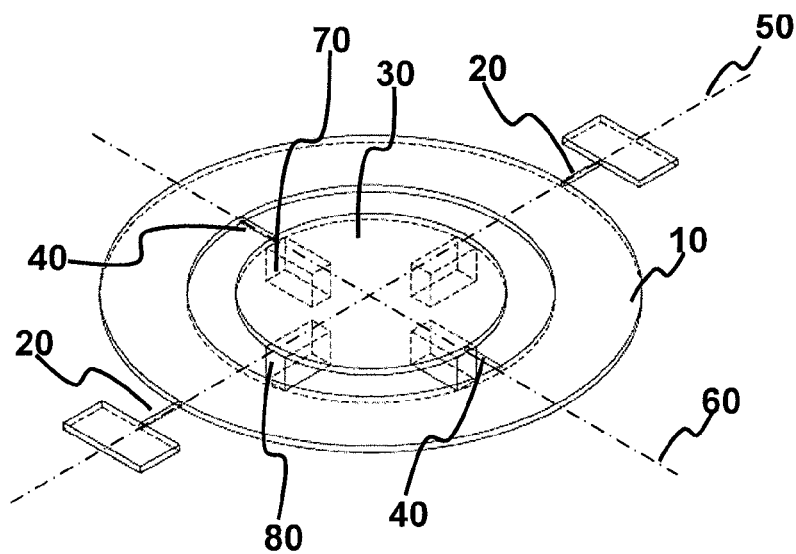
FIG. 1A is a top view and FIG. 1B is a bottom view.
Figure 1B:
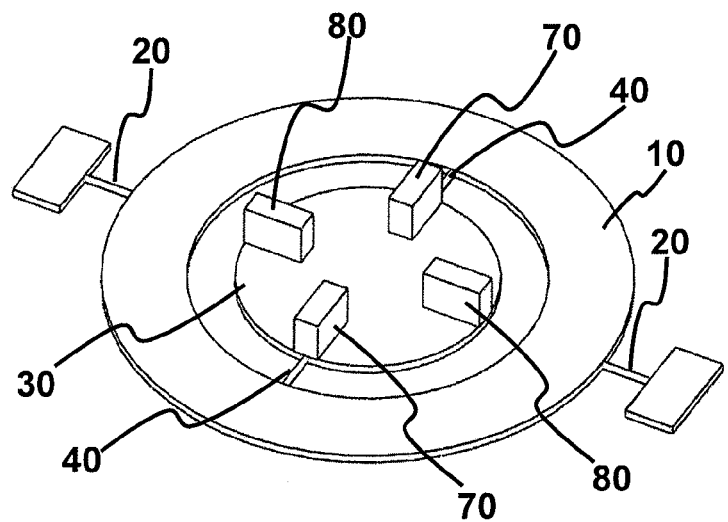

Turning now to the drawings in detail, FIGS. 1A and 1B show an embodiment of a biaxial MEMS structure. The principal features of the MEMS structure are gimbal 10, gimbal torsional bars 20, mirror plate 30, and mirror plate torsional bars 40. Gimbal 10 is rotated by gimbal torsional bars 20 about a gimbal axis of rotation 50. Similarly, mirror plate 20 is rotated by mirror plate torsional bars 40 about a mirror plate axis of rotation 60.

One or more blocks 70 and one or more blocks 80 are positioned underneath the mirror plate in order to affect the moment of inertia and, thereby, the resonant frequency of the mirror plate. Note that in the exemplary embodiments the blocks are positioned on the rear surfaces of the mirror plate and/or gimbal; however, the blocks may optionally be positioned on the front surfaces of the mirror plate and/or gimbal with the same effect. The effect of the blocks on the moment of inertia is explained as follows. In a rotation dynamic, the moment of inertia plays a role similar to the role of a mass in a linear dynamic. The moment of inertia determines the relationship between angular momentum and angular velocity, torque, and angular acceleration. It is a measure of an object's resistance to change in its rotation rate. The moment of inertia J of a point mass rotating about a known axis is defined by:

$$J = mr^2 \qquad (1)$$

where m is mass and r is the perpendicular distance to the axis of rotation.

The resonant frequency of the object in rotation is given by:

$$f = \frac{1}{2\pi}\sqrt{\frac{k}{J}} \qquad (2)$$

where f is the resonant frequency and k is the effective rotation stiffness. From this equation it can be seen that the parameter that governs the resonant frequency is moment of inertia, which includes the mass m and the distance r. A large moment of inertia will reduce an object's resonant frequency and create a low resonant frequency device. However, as seen from equation (1), a large moment of inertia results not only from mass, but also from the perpendicular distance of the mass to the rotation axis.

Accordingly, the present embodiment increases the moment of inertia without significantly increasing the mass. Regarding equation (1), moment of inertia J increases proportionally with m, but increases proportionally with the second power of r. Therefore, by locating the center of mass of the block(s) substantially away from the axis of rotation, a minor adjustment of the perpendicular distance r will cause a significant change in the moment of inertia J. Rather than enlarging the mirror plate 30 in the XY plane, the block(s) 70 and 80 are fabricated underneath the mirror plate (opposite to the mirror surface) as seen in FIGS. 1A and 1B. One advantage of maintaining the area of mirror plate 30 is that the drag force (the damping) on the mirror plate remains unchanged. If the damping is not increased by increasing the moment of inertia through increasing the mirror plate area, there will be no extra driving torque required to compensate for damping. Low driving torque results in low power consumption. Without significantly changing the mirror plate's mass, the block(s) adjust the moment of inertia efficiently, hence adjusting the resonant frequency of a scanning mirror incorporating the MEMS structure.

According to the techniques of the present embodiment, the resonant frequency of a scanning mirror can be precisely controlled through the size and location of blocks 70 and 80. For a biaxial scanning mirror with perpendicular rotation directions (that is, gimbal rotation axis 50 and mirror rotation axis 60), the mirror plate 30 and the gimbal 10 usually have different resonant frequencies. Suppose a point mass m is close to the rotation axis of a mirror plate with a perpendicular distance from the mirror plate rotation axis $r_m$, but substantially away from the gimbal axis of rotation with a perpendicular distance from the gimbal axis of rotation, $r_g$, which is substantially greater than $r_m$, that is: $r_g \gg r_m$. So the moment of inertia with respect to the mirror axis and the gimbal axis are:

$$J_m = mr_m^2 \qquad (3)$$

$$J_g = mr_g^2 \qquad (4)$$

respectively. If the mass m increases as $m+\Delta m$, the change in moment of inertia $\Delta J_g = \Delta m r_g^2$ will be larger than that of $\Delta J_m = \Delta m r_m^2$ since $r_g \gg r_m$. If the distance $r_g$ changes to $r_g + \Delta r_g$ while keeping $r_m$ unchanged, $J_g$ will increase substantially while $J_m$ will remain unchanged.

If the ratio of $r_g/r_m$ is precisely designed, a desirable ratio of $J_g/J_m$ can be created. Using this technique, the present embodiment is able to adjust the resonant frequency of the mirror plate and gimbal independently.

Figure 2A:
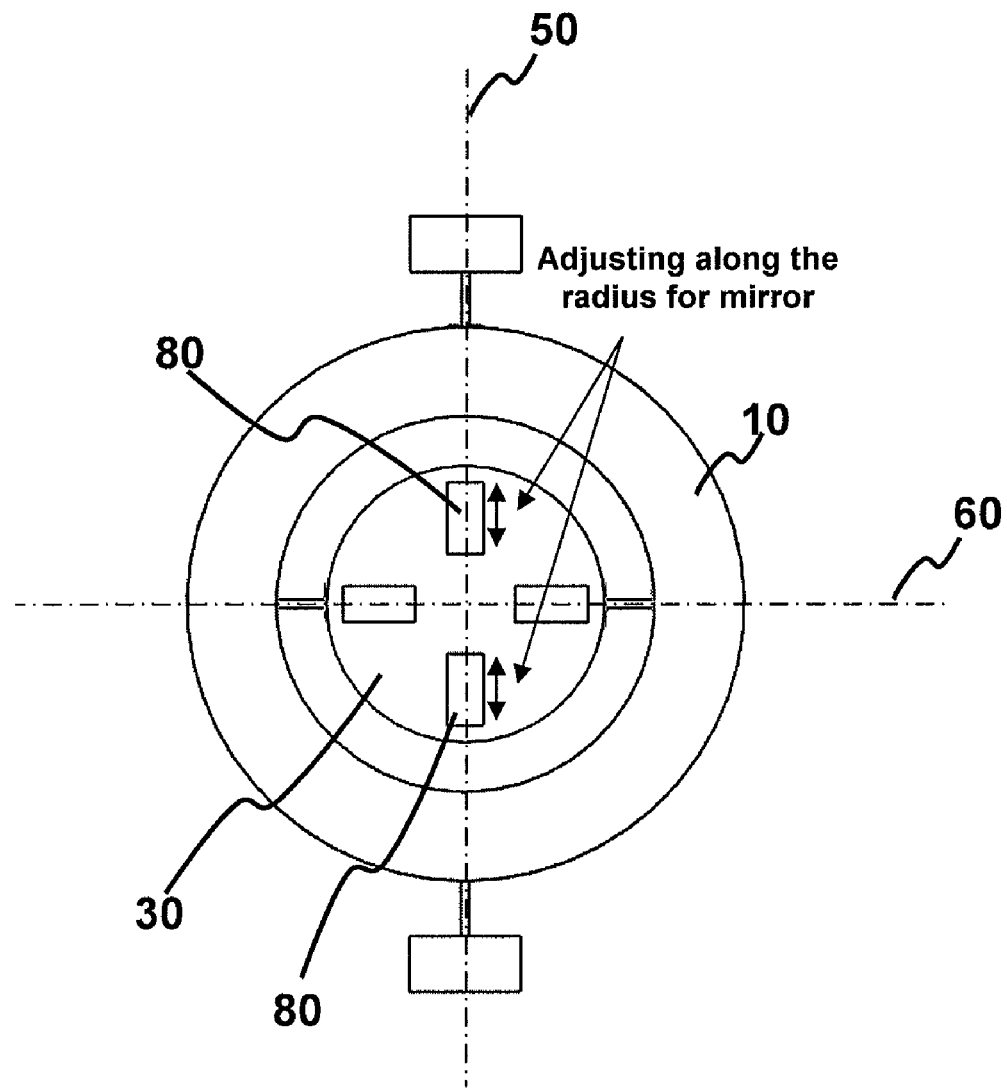
FIGS. 2A, 2B, and 2C demonstrate techniques for altering mirror plate and gimbal moments of inertia.
Figure 2B:
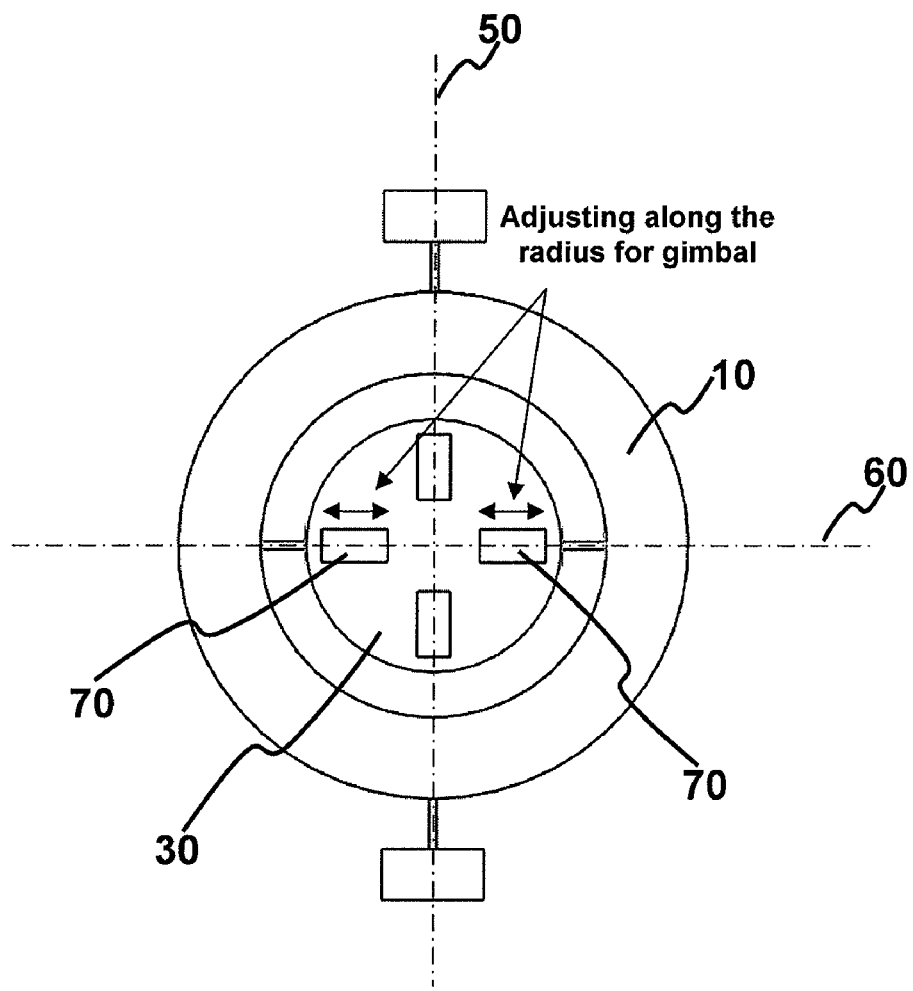

In the exemplary embodiment of FIGS. 1A and 1B, there are four blocks under the mirror plate 30. A pair of blocks 70 for altering the moment of inertia with respect to the gimbal axis 50 is located adjacent the edge of mirror plate 30 and aligned with mirror rotation axis 60. A second pair of blocks 80 for altering the moment of inertia with respect to mirror axis 60 is also located adjacent the edge of mirror plate 30 but is aligned with gimbal rotation axis 50. For the block pair 80 aligned along gimbal rotation axis 50, length and/or position adjustment in the radial direction (towards or away from mirror axis 60), as seen in FIG. 2A, adjusts the moment of inertia of mirror plate 30 efficiently, but does not significantly affect the gimbal moment of inertia based on equations (3) and (4). In contrast, for the block pair 70 aligned along mirror axis 60 length and/or position adjustment in the radial direction (towards or away from gimbal axis 50), as seen in FIG. 2B, adjusts the moment of inertia of gimbal 10 efficiently, but does not significantly affect the mirror plate moment of inertia. Since radial distance rather than mass is the primary factor to adjust the moment of inertia, the selected mass can be relatively small. Various positions in the radial direction can efficiently and precisely adjust the moment of inertia. The ratio of the radial distance in block pairs 70 and 80 can be finely tuned to create the desired mirror plate resonant frequency and gimbal resonant frequency.

Figure 2C:
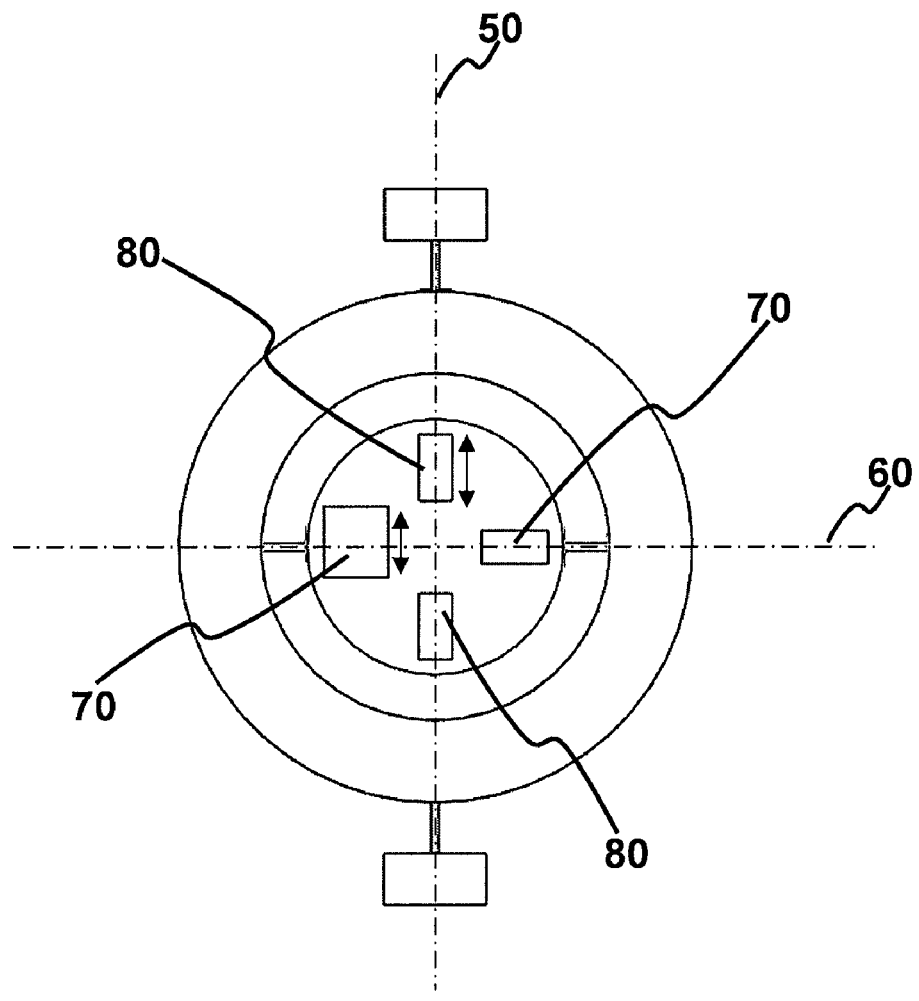

Each of the blocks in block pairs 70 and 80 can be independently sized and/or positioned with respect to the rotation axis that the block pair will affect. Each block in a pair need not be the same size as the other block of the block pair, as seen in block pair 70 in FIG. 2C. In block pair 70, one block is selected to have a greater width than the other blocks. Using this combination of independent size and position selection, a given combination can control the resonant frequencies of both the mirror plate 30 and the gimbal 10. Further, although the blocks 70 and 80 are shown as having a parallelepiped shape, other block shapes may be selected, some of which are described below; however, the shape of the block can be arbitrarily selected based on the desired resonant frequency response of the system.

Figure 3:
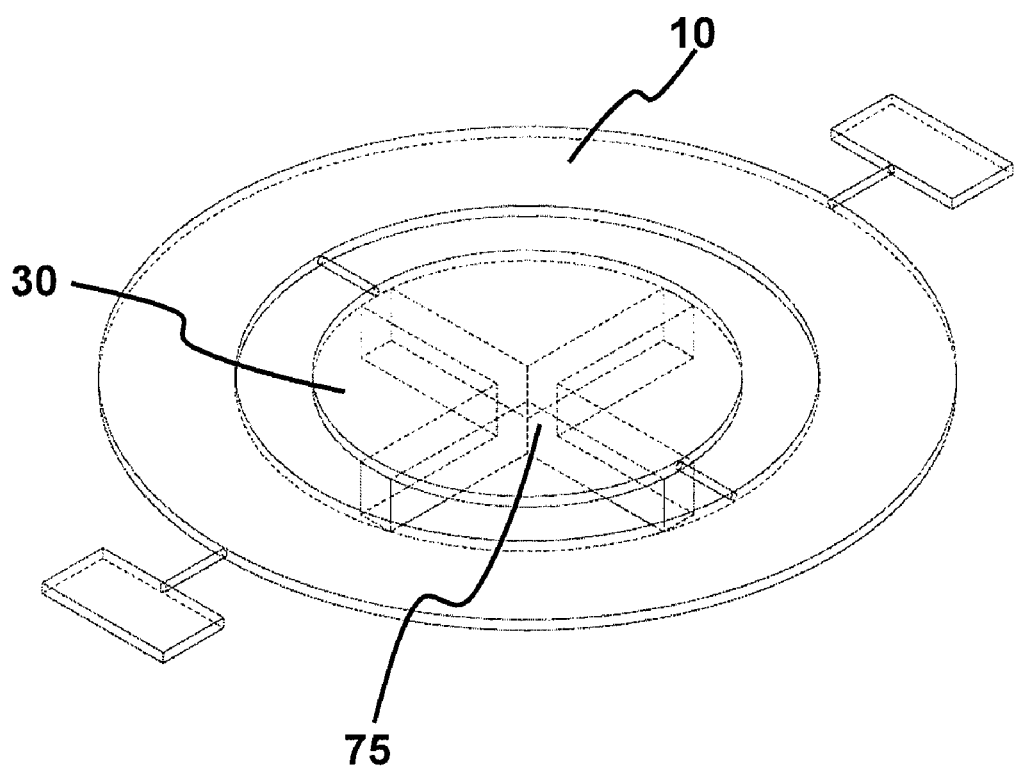
FIG. 3 depicts a biaxial MEMS structure having a moment-of-inertia-altering structure in the form of a cross.

In the exemplary embodiment of FIG. 3, the length adjustment of the block pairs causes the blocks to merge with each other, forming a cross-shaped structure 75. The biaxial structure can be adjusted by the configuration/thickness of the blocks that form the cross. In additional, the cross structure increases the mirror plate stiffness and reduces its dynamic deformation during scanning.

Figure 4:
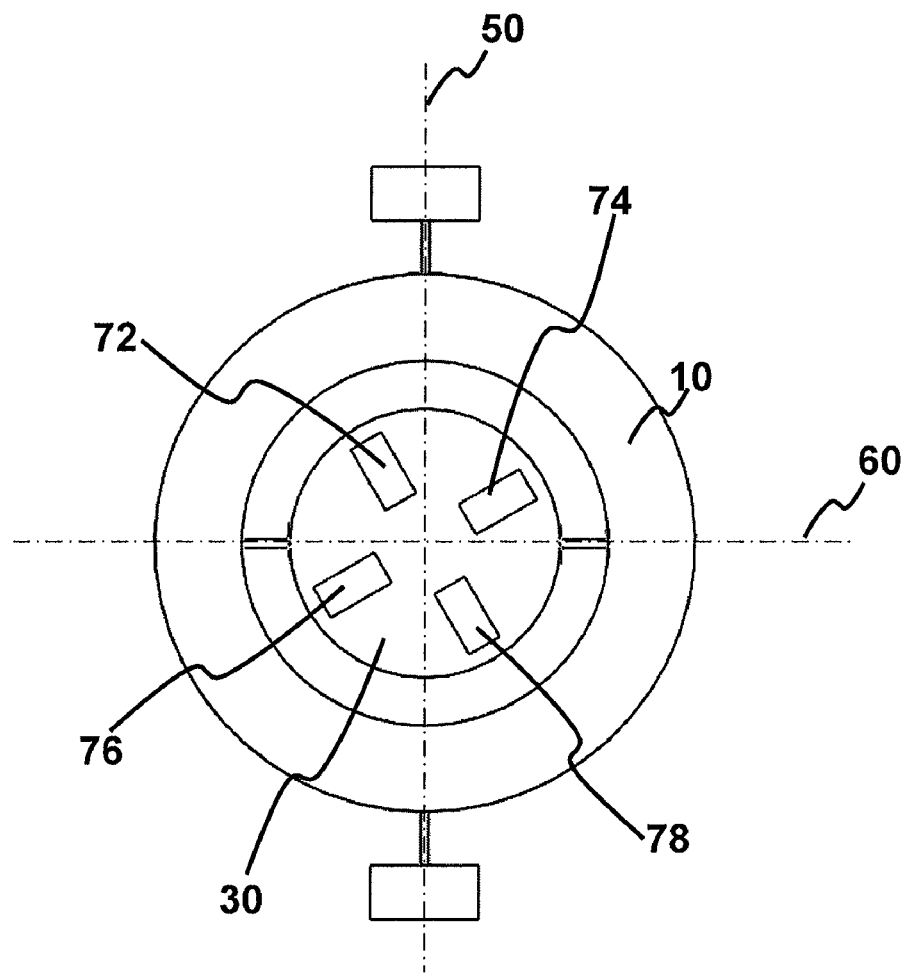
FIG. 4 depicts a biaxial MEMS structure having moment-of-inertia-altering blocks rotated away from the axes of rotation to other angles.

A further exemplary embodiment is depicted in FIG. 4. In the configuration shown in FIG. 4, there are four blocks 72, 74, 76, and 78; the block positions are rotated away from the axes of rotation to other angles. The selection of the angle depends on the size of the blocks, the distance from the axes of rotation and the desired resonant frequency. The structure depicted in FIG. 4 is no longer axis symmetric, but is still center symmetric. The same equations govern the adjusting method as in the above embodiments.

Figure 5:
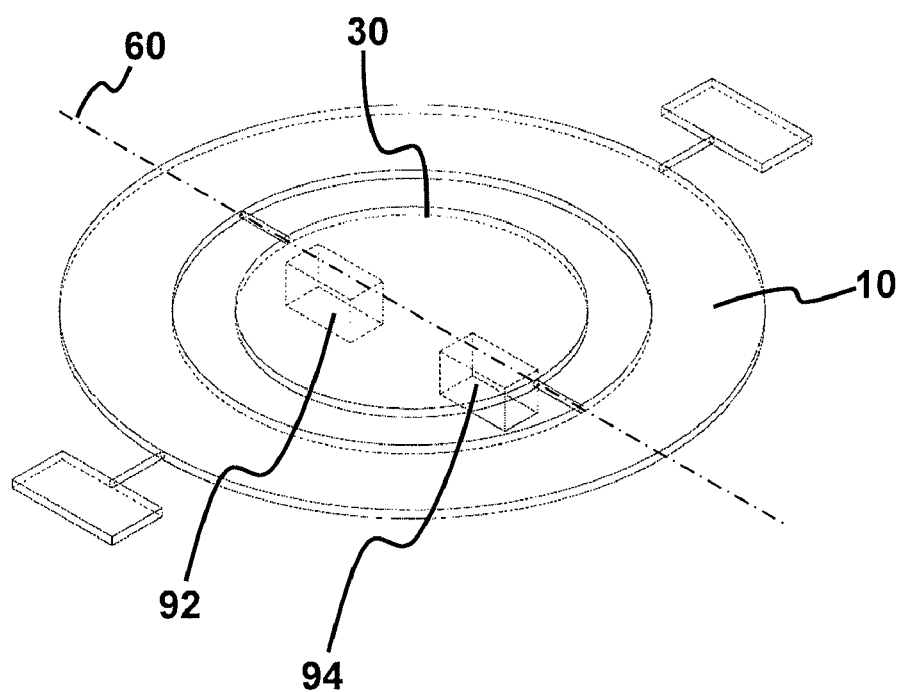
FIG. 5 shows a biaxial MEMS structure with a single pair of moment-of-inertia-altering blocks.
Figure 6:
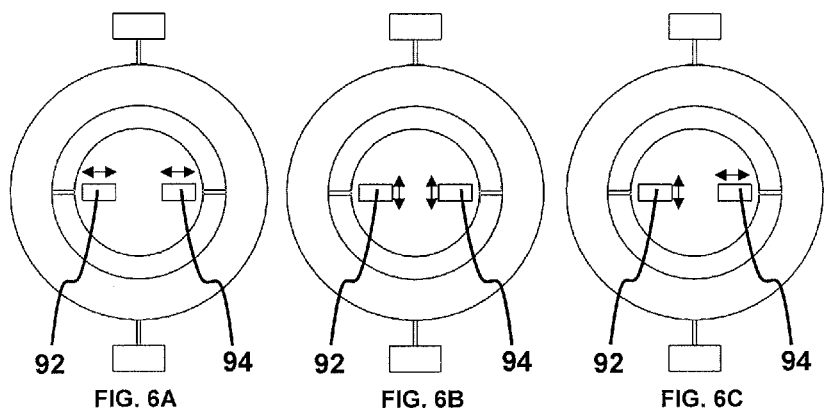
FIGS. 6A-6C shows methods for adjusting the blocks of the MEMS structure of FIG. 5.
Figure 8:
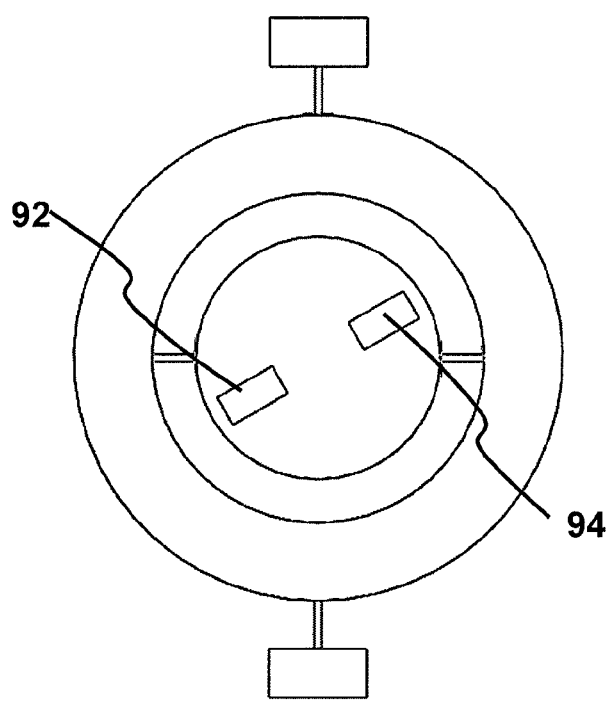
FIG. 8 shows a method for adjusting the blocks of the MEMS structure of FIG. 5.

A further exemplary embodiment is shown in FIG. 5. A single pair of blocks, 92 and 94 is positioned in alignment with the mirror axis 60. The ratio of the resonant frequency adjustment between mirror plate 30 and gimbal 10 can be designed by adjusting the ratio between the length and width of blocks 92 and 94. Similar to the above embodiments, there are three methods to adjust this ratio. Method one is adjustment in radius direction, method two is the adjustment perpendicular to the radius direction and method three is a combination of methods one and two as depicted in FIGS. 6A-6C. Note that although FIGS. 5 and 6 depict a pair of blocks aligned with the mirror axis, this embodiment may alternatively use a pair of blocks aligned along the gimbal axis. Further, as shown in FIG. 8, blocks 92 and 94 can be rotated from an axial alignment to any angle.

Figure 7:
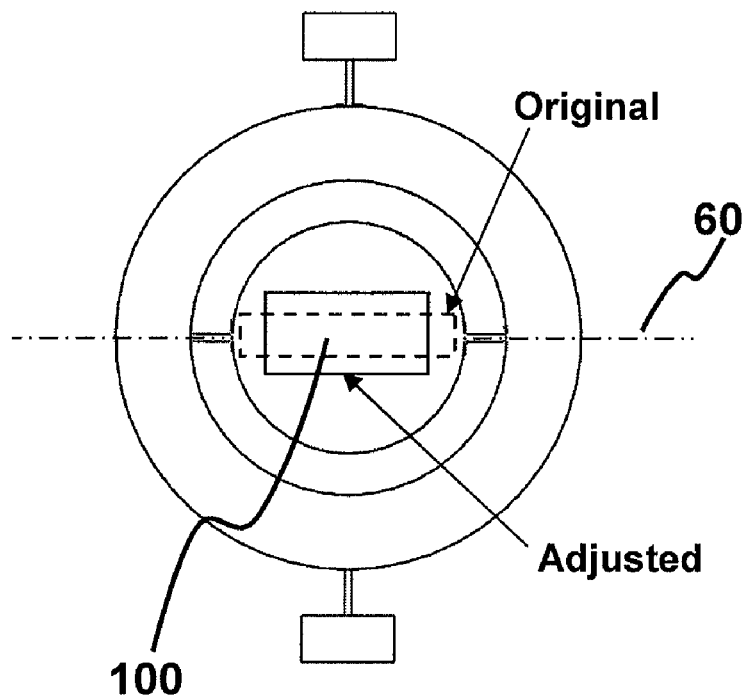
FIG. 7 shows a biaxial MEMS structure with a single block for altering the moment of inertia.

In the embodiment of FIG. 7, a pair of blocks is merged to form a single rectangular block 100. Adjusting block 100's length and width independently causes different changes in mirror and gimbal resonant frequencies.

Figure 9:
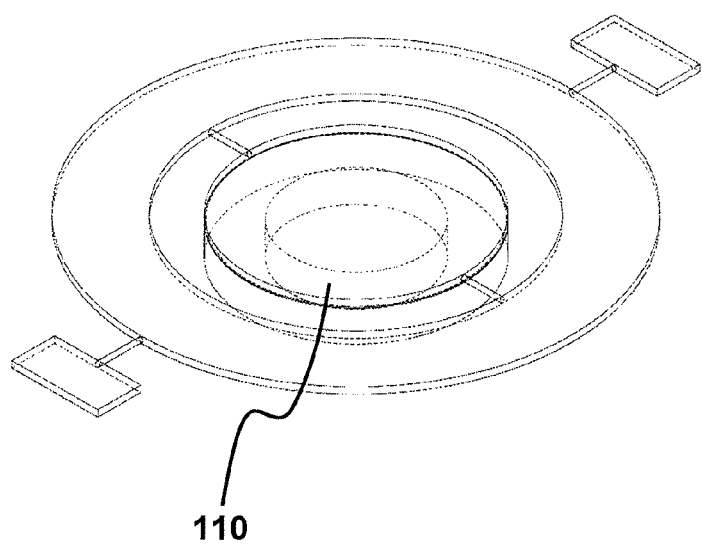
FIG. 9 shows a biaxial MEMS structure using a ring-shaped block to adjust the moment of inertia.
Figures 10A, 10B, 10C, 10D:
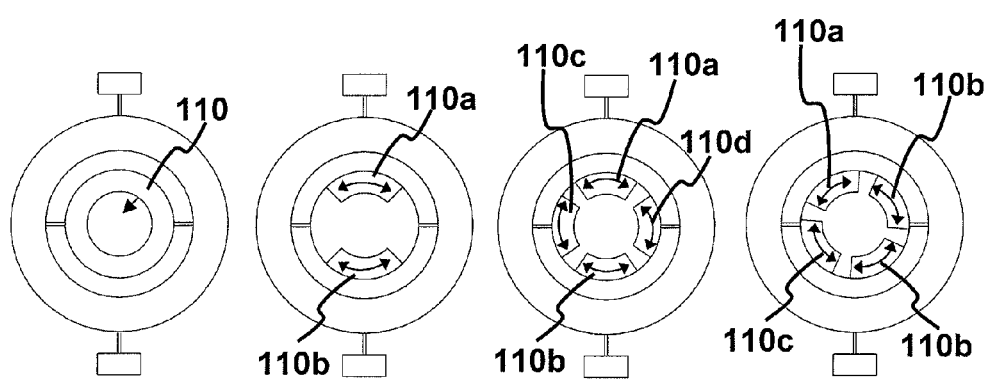
FIGS. 10A-10D depict methods for altering the moment of inertia using the ring-shaped block of FIG. 9.

Other shapes may be used as a mass to be positioned under the mirror plate. As seen in FIG. 9, a ring-shaped block 110 is used to adjust the resonant frequency. To adjust the resonant frequency, several techniques can be used. One technique adjusts the inner radius in the radial direction, shown in FIG. 10A. Alternatively, the ring can be separated into multiple parts, 110a and 110b as seen in FIG. 10B, or 110a, 110b, 110c, and 110d as seen in FIGS. 10C and 10D. When separated into multiple parts, each part has an arc-shaped cross-section. FIG. 10C is an axis-symmetric positioning of the ring parts while FIG. 10D is a center-symmetric positioning of the ring parts. By adjusting the length of every arc, the resonant frequencies of the mirror and gimbal can be adjusted independently. Another advantage of the ring-shaped block is that it enhances the mirror plate's stiffness and reduces its dynamic deformation during scanning.

Figures 11A, 11B:
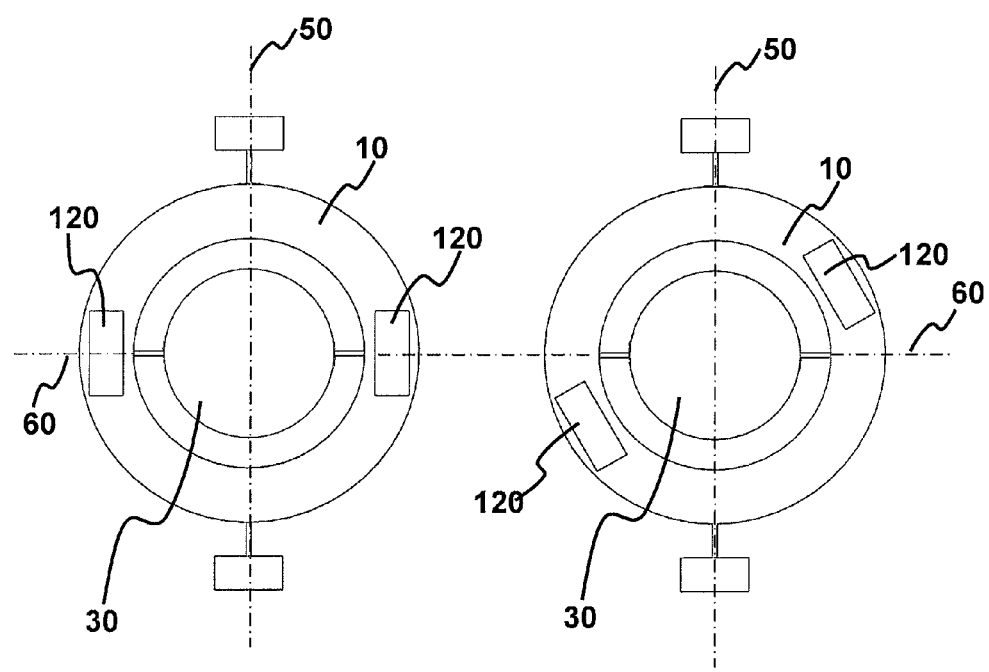
FIGS. 11A-11B show a biaxial MEMS structure using a single pair of moment-of-inertia-altering blocks.

Alternatively, the moment-of-inertia-altering block can be positioned under gimbal 10 as seen in FIG. 11. FIG. 11A depicts blocks 120 arranged symmetrically with respect to the mirror axis 60 while FIG. 11B depicts blocks 120 arranged in a center-symmetric configuration. The length and width of the blocks can also be altered to change the resonant frequency.

Figures 12A, 12B:
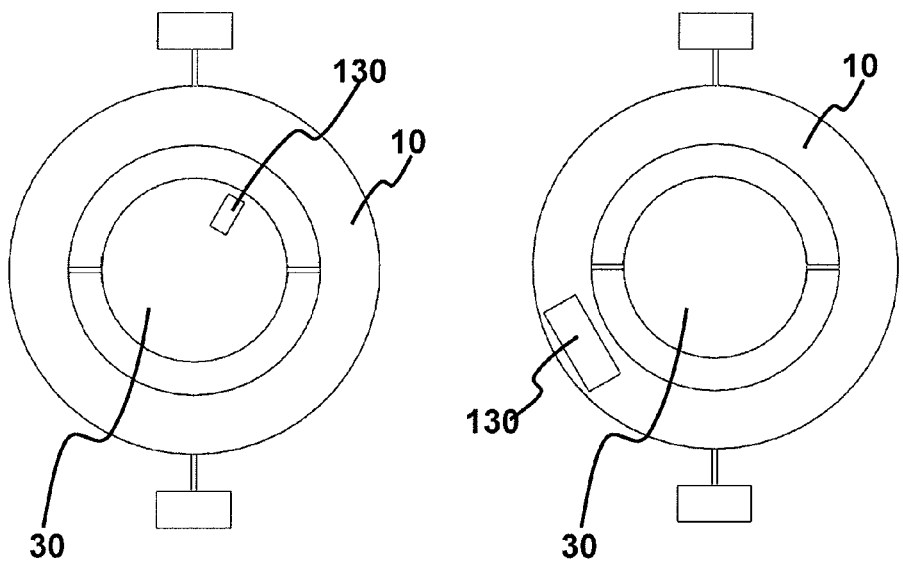
FIGS. 12A-12B show a biaxial MEMS structure using a single moment-of-inertia-altering block.

In the embodiment of FIG. 12, a single asymmetrically-positioned block 130 may be positioned on or under either mirror plate 30 (FIG. 12A) or gimbal 10 (FIG. 12B). The size and position of the block 130 is selected in accordance with the desired resonant frequency.

The MEMS structures of the present embodiments are typically fabricated from silicon using a variety of known silicon-processing techniques. An exemplary process is depicted in FIGS. 13A-13G; this process can fabricate a variety of block shapes and configurations.

Figure 13A:
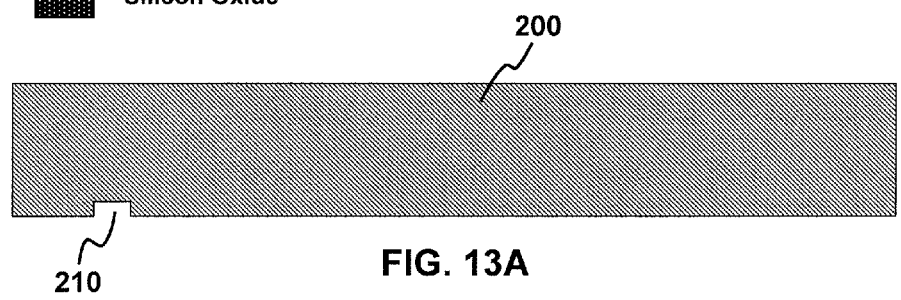
FIGS. 13A-13G depict an exemplary manufacturing process for the MEMS structures.
Figure 13B:
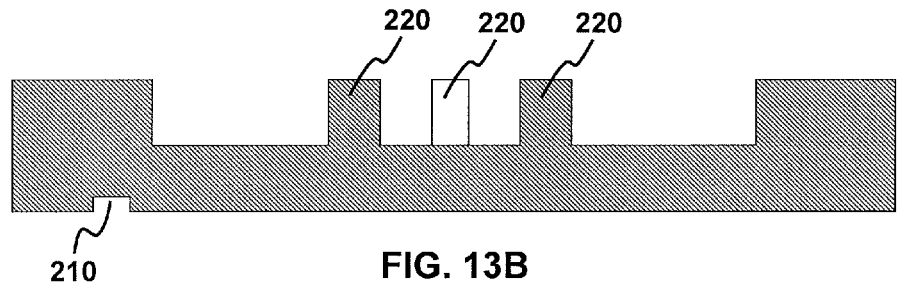
Figure 13C:
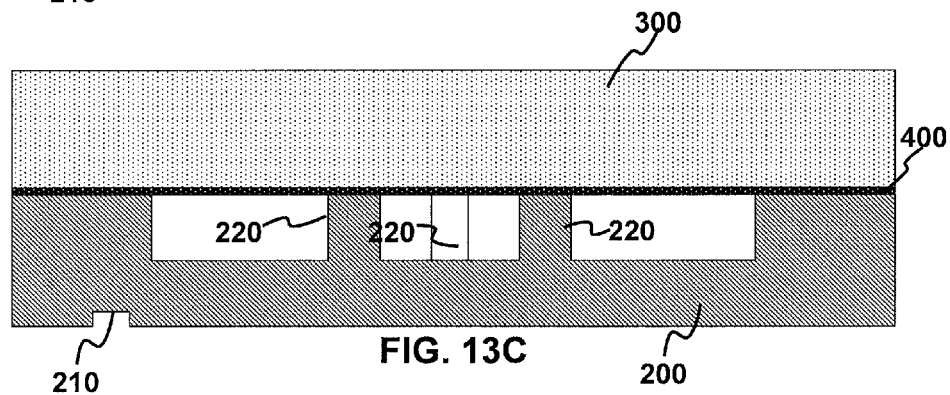

In FIG. 13A a silicon wafer 200 acts as the base of the structure; an alignment mark 210 is made on the backside of the wafer. In FIG. 13B, block(s) 220 is (are) made on the front side of the base wafer, the shape and the height of the block(s) can be made according to a selected design to create a desired resonant frequency. A top silicon wafer 300 which acts as the device wafer is bonded to the base wafer by anodic bonding through silicon oxide 400, as seen in FIG. 13C.

Figure 13D:
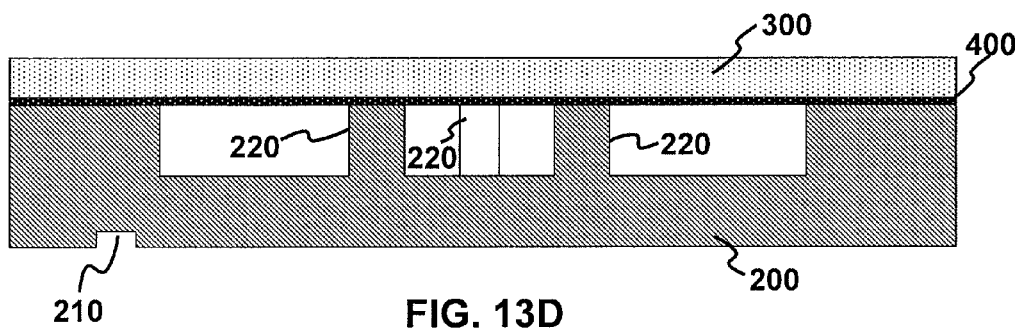
Figure 13E:
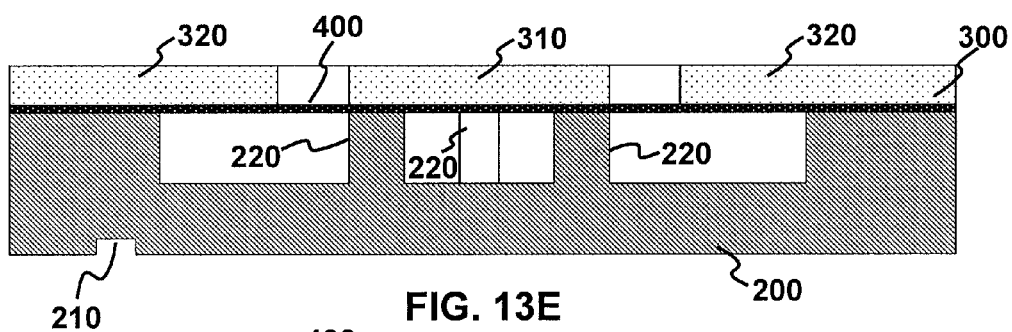
Figure 13F:
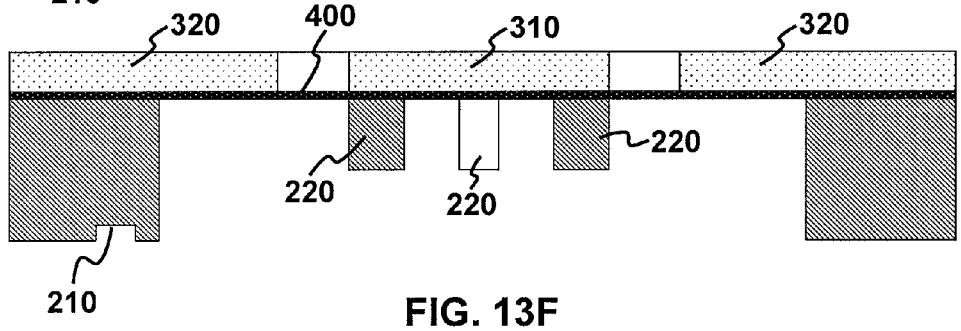
Figure 13G:
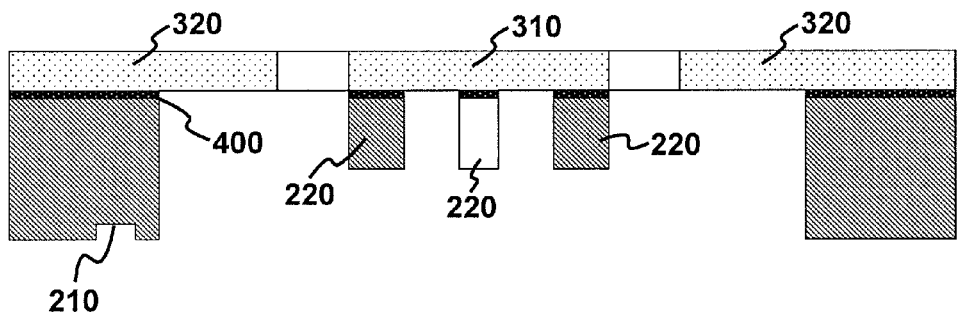

To create the desired MEMS device thickness, top wafer 300 is thinned by grinding or chemical-mechanical polishing as shown in FIG. 13D. In FIG. 13E the mirror 310 and gimbal 320 shapes are patterned by aligning the alignment mark 210 from the base wafer 200. Following patterning, the base wafer is removed to leave only the blocks 220 as seen in FIG. 13F. Finally, in 13G, the silicon oxide 400 is removed (except where it bonds the blocks to the mirror plate and gimbal) to release the MEMS structure, allowing the mirror and gimbal to rotate.

Figure 14:
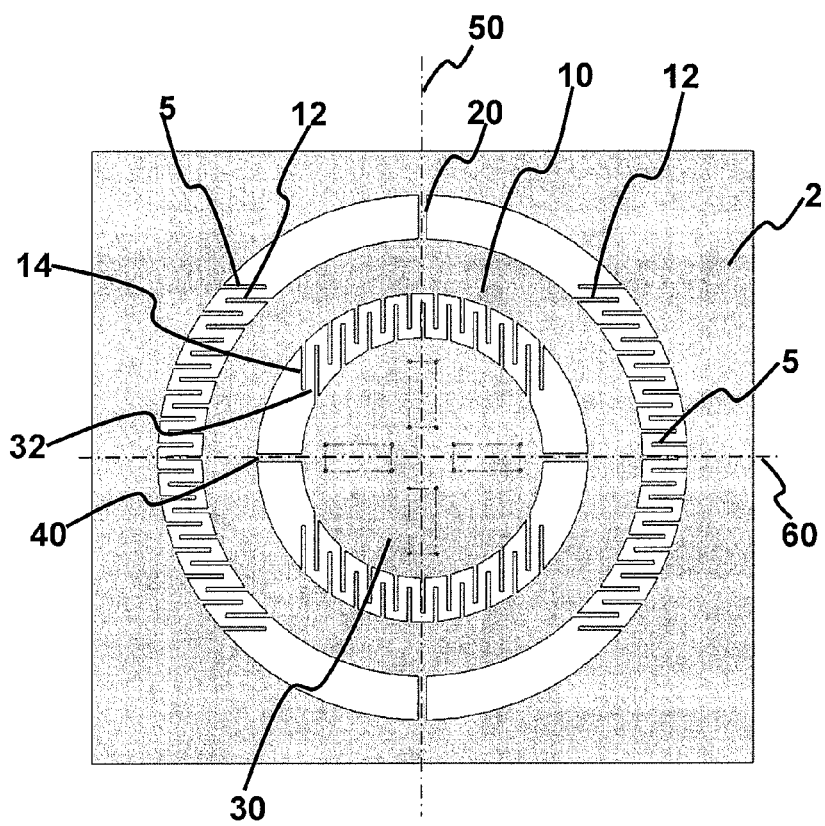
FIG. 14 shows a biaxial MEMS structure with comb structures for electrostatic actuation.

In an electrostatically-actuated MEMS structure, interleaved electrodes have a comb-shaped structure are typically employed. Such a structure is depicted in FIG. 14. In this structure, gimbal 10 has two sets of comb-shaped structures, one which interfaces with a support comb structure and the other which interfaces with a mirror plate comb structure. As seen in FIG. 14, gimbal comb structure 12 interfaces with support comb structure 5 to deflect gimbal 10 about gimbal axis 50. Gimbal comb structure 14 interfaces with mirror plate comb structure 32 to deflect mirror plate 30 about mirror plate axis 60. As seen in FIG. 14, mirror plate 30 is located in the center and supported by a pair of torsional bars 40 having one end connected to gimbal 10; the gimbal 10 again is supported by another pair of orthogonal torsional bars 20 having one end connected to a fixed frame 2. Mirror 30 and gimbal 10 have comb-drives in orthogonal orientations; therefore, rotational motion in both the x- and y-directions can be actuated. Typically the gimbal connects to ground. With electrical isolation, signals with different voltage amplitudes and frequencies can be applied to the mirror and fixed frame respectively to actuate the device.

Figure 15:
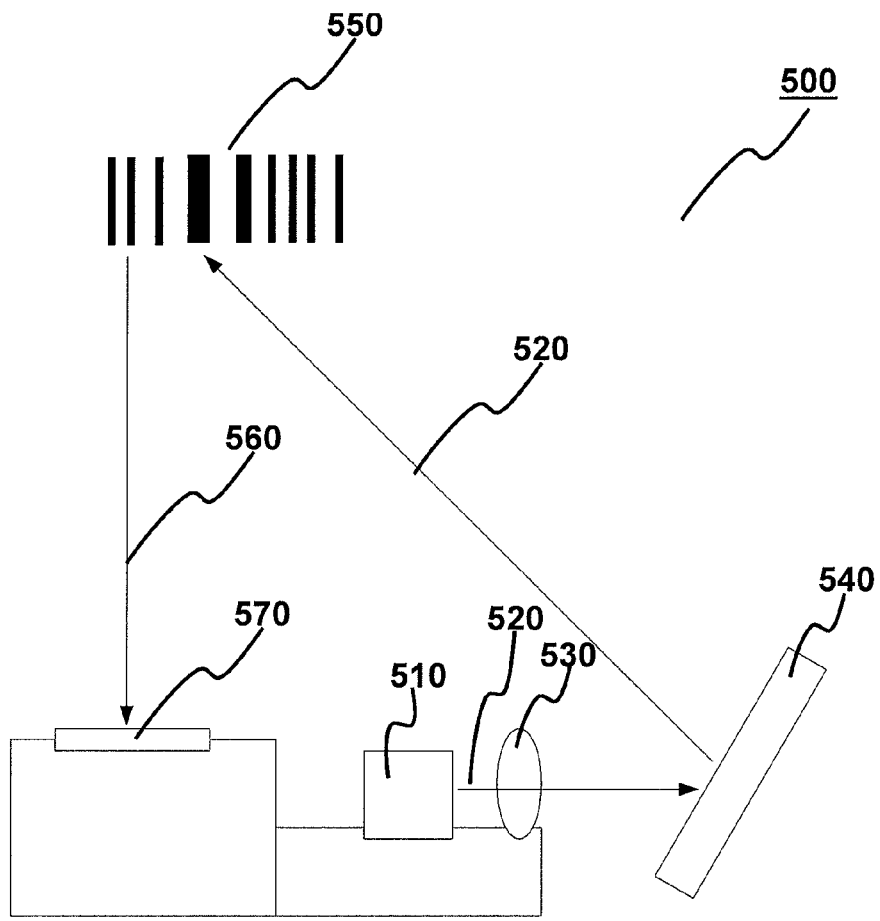
FIG. 15 schematically depicts a scanner incorporating a biaxial MEMS structure.

FIG. 15 schematically depicts a bar-code scanning system 500 employing a MEMS device of the present embodiment. In the scanning system 500 a light source 510 such as a laser or LED emits light 520 which passes through focusing optics 530 and is incident on MEMS device 540. Motion of the mirror plate, as discussed above, scans reflected light 520 onto an image to be scanned such as bar code 550. Reflected light 560 is collected by light collector 570, such as a photodiode to read the image. Although the MEMS device is shown as separate from the light source, those skilled in the art will appreciate that the light source, light collecting element, and MEMS device can be integrated on the same substrate. Further, although the scanning system depicted is a bar-code reader, it is understood that scanning system could be used in a variety of applications, including, but not limited to, displays, projectors, switches, printers, retinal displays, resonators, and sensors which may or may not include a photodiode as illustrated in the above system.

While particular embodiments of the present invention have been illustrated and described, it is understood that the invention is not limited to the precise construction depicted herein and that various modifications, changes, and variations are apparent from the foregoing description. Such modifications, changes, and variations are considered to be a part of the scope of the invention as set forth in the following claims.

What is claimed is:

1. A biaxial micro-electromechanical (MEMS) device comprising:
   a gimbal rotatable about a gimbal axis of rotation;
   a pair of gimbal torsion bars connected between the gimbal and a support, the gimbal torsion bars extending along the gimbal axis of rotation;
   a mirror plate rotatable about a mirror axis of rotation, the mirror axis of rotation being substantially perpendicular to the gimbal axis of rotation;
   a pair of mirror plate torsion bars connected between the mirror plate and the gimbal and extending along the mirror plate axis of rotation;
   one or more gimbal moment-of-inertia-altering blocks for altering the moment of inertia of the gimbal, each of the one or more gimbal moment-of-inertia-altering blocks having a center of mass positioned substantially away from the gimbal axis of rotation on a surface of the mirror plate; and
   one or more mirror plate moment-of-inertia-altering blocks for altering the moment of inertia of the mirror plate, each of the one or more mirror plate moment-of-inertia-altering blocks having a center of mass positioned substantially away from the mirror plate axis of rotation on a surface of the mirror plate, wherein a distance of the mirror plate moment-of-inertia-altering blocks from the mirror plate axis determines a resonant frequency of the biaxial MEMS device.

2. The biaxial micro-electromechanical (MEMS) device of claim 1, wherein the gimbal moment-of-inertia-altering blocks are aligned along the mirror axis.

3. The biaxial micro-electromechanical (MEMS) device of claim 1, wherein the mirror plate moment-of-inertia-altering blocks are aligned along the gimbal axis.

4. The biaxial micro-electromechanical (MEMS) device of claim 1, wherein the gimbal moment-of-inertia-altering blocks are not aligned along the mirror axis and are center-symmetric.

5. The biaxial micro-electromechanical (MEMS) device of claim 1, wherein the gimbal moment-of-inertia-altering blocks are not aligned along the mirror axis and are center-asymmetric.

6. The biaxial micro-electromechanical (MEMS) device of claim 1, wherein the mirror plate moment-of-inertia-altering blocks are not aligned along the gimbal axis and are center-symmetric.

7. The biaxial micro-electromechanical (MEMS) device of claim 1, wherein the mirror plate moment-of-inertia-altering blocks are not aligned along the gimbal axis and are center-asymmetric.

8. The biaxial micro-electromechanical (MEMS) device of claim 1, wherein the mirror plate and the gimbal include comb structures for electrostatic activation.

9. The biaxial micro-electromechanical (MEMS) device of claim 1, wherein at least one block has a parallelepiped shape.

10. The biaxial micro-electromechanical (MEMS) device of claim 1, wherein at least one block has an arc-shape in cross-section.

11. The biaxial micro-electromechanical (MEMS) device of claim 1, wherein the at least one mirror moment-of-inertia-altering blocks and the at least one gimbal moment-of-inertia altering blocks together form a cross-shaped structure.

12. The biaxial micro-electromechanical (MEMS) device of claim 1, wherein the at least one mirror moment-of-inertia-altering blocks and the at least one gimbal moment-of-inertia altering blocks are positioned on a rear surface of the mirror plate.

13. The biaxial micro-electromechanical (MEMS) device of claim 1, wherein the at least one mirror moment-of-inertia-altering blocks and the at least one gimbal moment-of-inertia altering blocks together form a ring-shaped structure.

14. A scanning system including the biaxial micro-electromechanical (MEMS) device of claim 1.

15. A biaxial micro-electromechanical (MEMS) device comprising:
    a gimbal rotatable about a gimbal axis of rotation;
    a pair of gimbal torsion bars connected between the gimbal and a support, the gimbal torsion bars extending along the gimbal axis of rotation;
    a mirror plate rotatable about a mirror axis of rotation, the mirror axis of rotation being substantially perpendicular to the gimbal axis of rotation;
    a pair of mirror plate torsion bars connected between the mirror plate and the gimbal and extending along the mirror plate axis of rotation;
    one or more moment-of-inertia-altering blocks for altering the moment of inertia of both the gimbal and the mirror plate, each of the one or more gimbal moment-of-inertia-altering blocks having a center of mass positioned substantially away from the gimbal axis of rotation and substantially away from the mirror axis of rotation on a surface of at least one of the mirror plate or the gimbal, wherein a distance of the one or more moment-of-inertia-altering blocks from the mirror plate axis and from the gimbal axis determines a resonant frequency of the biaxial MEMS device.

16. The biaxial micro-electromechanical (MEMS) device of claim 15, wherein the one or more moment-of-inertia-altering blocks are positioned on a gimbal surface.

17. The biaxial micro-electromechanical (MEMS) device of claim 15, wherein the one or more moment-of-inertia-altering blocks is a single moment-of-inertia-altering block positioned on a gimbal surface.

18. The biaxial micro-electromechanical (MEMS) device of claim 17, wherein the single moment-of-inertia-altering block is positioned on a rear gimbal surface.

19. The biaxial micro-electromechanical (MEMS) device of claim 15, wherein the one or more moment-of-inertia-altering blocks is a single moment-of-inertia-altering block positioned on a mirror plate surface.

20. A scanning system including the biaxial micro-electromechanical (MEMS) device of claim 15.

* * * * *